Oct. 7, 1969 HIROSHI IHARA 3,471,516

DIGIT LINE COUPLING CIRCUITRY FOR MAGNETIC MEMORY DEVICES

Filed Nov. 30, 1965

INVENTOR.
HIROSHI IHARA

BY

OSTROLENK, FABER, GERB & SOFFEN

ATTORNEYS

United States Patent Office 3,471,516

Patented Oct. 7, 1969

3,471,516
DIGIT LINE COUPLING CIRCUITRY FOR MAGNETIC MEMORY DEVICES

Hiroshi Ihara, Tokyo, Japan, assignor to Nippon Electric Company Limited, Tokyo, Japan Filed Nov. 30, 1965, Ser. No. 510,646
Claims priority, application Japan, Nov. 30, 1964, 39/67,566
Int. Cl. G11c *7/02, 5/08*
U.S. Cl. 340—174 3 Claims

ABSTRACT OF THE DISCLOSURE

A magnetic memory having a U-shaped digit drive line. A plurality of magnetic cores are arranged at spaced intervals along the digit drive line whose end terminals are terminated in characteristic impedances which are equal to one another. The mid-point of the substantially U-shaped digit drive line is coupled to a digit driving circuit for applying a digit driving pulse passing through the two halves of the digit drive line and arriving at its end terminals in time synchronism. In order to absolutely maintain the characteristic impedance of the digit drive line a grounded conductor is positioned adjacent the entire length of the digit drive line at a constant spacing along the entire digit drive line. The output terminals of the digit drive line are coupled across the end terminals of the primary winding of a transformer whose secondary winding is coupled to a sensing circuit. The center tap terminal of the secondary winding is grounded. Any digit drive signals applied to the mid-point of the digit drive line arrive in time syncnronism at the digit drive line end terminals and substantially exactly cancel one another out so as to eliminate the application of any noise pulses whatsoever upon the sensing means.

The instant invention relate to high-speed random access memory devices, and more particularly to digit line coupling circuitry for use in magnetic core or magnetic film memories to provide significant improvements in the drive and sensing circuitry.

With the advancement of technology in the field of magnetic memories in recent years, the demand for higher speed and larger capacity has been greatly accelerated. One of the major deterrents impeding high-speed operation of such memories has been the deleterious influence of excessive noise voltage signals due to the digit line drive pulse current which acts on the sense amplifier during write-in periods which, in turn, blocks the operation of the sense amplifier and impairs the ensuing read-out operation. The instant invention provides a novel digit line coupling circuit capable of minimizing the noise voltage caused by the digit line drive pulse current signal.

In conventional magnetic core and film memories which are typically comprised of a regular matrix of core or memory elements having digit drive, word drive and sense windings, the sense amplifier coupled to the sense windings is normally designed to provide extremely high gain which greatly amplifies the signal induced into the sense winding. The signal induced into the sense winding, as a result of the driving signal impressed upon the digit drive winding, is amplified to such a great extent that this noise voltage signal greatly impairs the read-out operation.

The instant invention is comprised of a memory matrix having a plurality of memory elements in each digit line and a digit drive winding which is inductively coupled with each of said memory elements. A conductor which is grounded along its entire length is positioned a constant distance away from the drive winding over its entire length. The drive winding and grounded conductor are arranged substantially in a U-shaped manner and simulate a transmission line having a characteristic impedance $Z_O$. Both ends of the simulated transmission line are terminated in the characteristic impedance $Z_O$. A driving pulse source is coupled to the drive winding at a point substantially half-way between its end terminals. Transformer means are provided with the primary winding being coupled across the end terminals of the drive winding and with the secondary winding being coupled to a sense amplifier.

Application of a drive pulse signal by the drive pulse source upon the drive winding causes the signal to be passed down both halves of the drive winding and to arrive at the end terminals of the drive winding at exactly the same time with both of the signals arriving at a predetermined time delay after application of the drive pulse signal to the drive winding. Since both signals are exactly in phase and have the same amplitude upon arrival at the end terminals of the drive pulse winding no signal will be developed across the primary winding of the transformer means and hence no signal will be applied by the transformer secondary winding to the sense amplifier thus totally eliminating the impression of a noise signal upon the sense amplifier.

This arrangement allows the digit drive line to perform the dual functions of operating both as the digit drive line and the sense winding, thereby greatly simplifying the matrix structure.

It is therefore one object of the instant invention to provide a novel digit line coupling circuit for use in driving magnetic memory device.

Another object of the instant invention is to provide a novel digit line coupling circuit for use in driving magnetic memory devices in which the application of a noise signal to the sense amplifier, as a result of a digit drive pulse, is completely eliminated.

Another object of the instant invention is to provide a novel digit line coupling circuit for use in magnetic memory devices being comprised of a digit drive winding inductively coupled to each of the memory elements and a conductor grounded along its entire length which is positioned at a constant distance from the drive winding along its entire length to simulate a transmission line having a characteristic impedance $Z_O$.

Still another object of the instant invention is to provide a novel digit line coupling circuit for use in magnetic memory devices being comprised of a digit drive winding inductively coupled to each of the memory elements and a conductor grounded along its entire length which is positioned at a constant distance from the drive winding along its entire length to simulate a transmission line having a characteristic impedance $Z_O$ wherein the drive winding and grounded winding are arranged in a U-shaped fashion with the end terminals of the windings being terminated in the characteristic impedance $Z_O$.

Still another object of the instant invention is to provide a novel digit line coupling circuit for use in magnetic memory devices being comprised of a digit drive winding inductively coupled to each of the memory elements and a conductor grounded along its entire length which is positioned at a constant distance from the drive winding along its entire length to simulate a transmission line having a characteristic impedance $Z_O$ wherein the drive winding and grounded winding are arranged in a U-shaped fashion with the end terminals of the windings being terminated in the characteristic impedance $Z_O$ and further comprising a drive pulse source coupled to the drive winding at a point substantially equidistant from the end terminals of the drive winding.

Still another object of the instant invention is to provide a novel digit line coupling circuit for use in magnetic memory devices being comprised of a digit drive winding inductively coupled to each of the memory elements and a conductor grounded along its entire length which is positioned at a constant distance from the drive winding along its entire length to simulate a transmission line having a characteristic impedance $Z_O$ wherein the drive winding and grounded winding are arranged in a U-shaped fashion with the end terminals of the windings being terminated in the characteristic impedance $Z_O$ and further comprising a drive pulse source coupled to the drive winding at a point substantially equidistant from the end terminals of the drive winding and transformer means coupled across the end terminals of the drive winding for coupling a sense amplifier to the digit drive winding.

These and other objects of the instant invention will become apparent from a consideration from the accompanying description and drawings in which.

Figure 1:
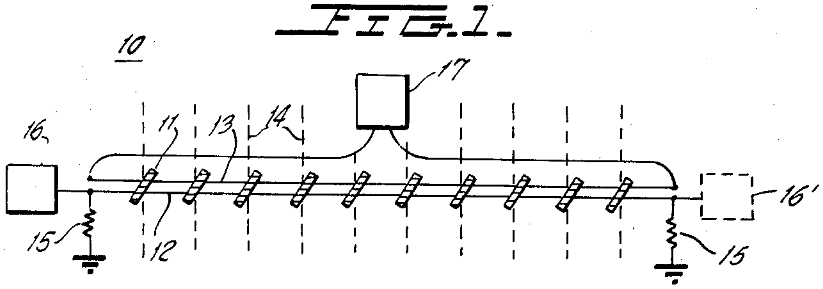
FIGURE 1 is a schematic diagram of a conventional digit line coupling circuit.

Referring now to the drawings, FIGURE 1 shows a portion of a conventional magnetic memory matrix 10 which is comprised of a plurality of magnetic memory elements 11 such as, for example, magnetic cores. Each of the magnetic cores 11 are provided with an associated word drive line 14, a digit drive line 12 and a sense line 13. Both the digit drive line 12 and sense line 13 are threaded through, or otherwise coupled to, the magnetic memory elements 11. The digit drive winding 12 may be provided with a termination resistance 15 and 15' at its opposite ends and a digit drive circuit 16 and 16' at its opposite ends. If desired, either of the digit drive circuits 16 or 16' may be omitted. A sense amplifier 17 is connected across the end terminals of the sense winding 13. It should be understood that the word drive lines 14 would likewise be provided with word drive circuits (not shown) and that additional rows of sense windings 13, digit drive windings 12 and memory element 11 may be provided so as to form a multi-row matrix. Additional rows of matrix arrangement 10 of FIGURE 1 have been omitted for purposes of simplicity.

Figure 2:
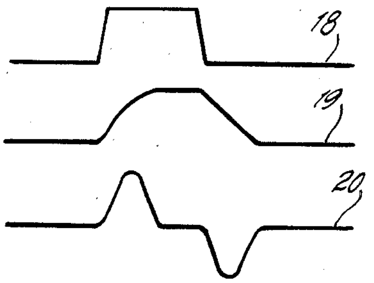
FIGURE 2 shows a plurality of waveforms for illustrating the operating principles of the circuit of FIGURE 1.

With a digit drive line and sense line arrangement as shown in FIGURE 1, the application of a digit drive pulse 18, shown in FIGURE 2, to the digit drive winding 12 which may, for example, be applied at the left-hand end of the digit drive winding 12 causes a pulse voltage having a waveform 19 to appear at the right-hand end of the digit drive line 12.

Consequently, the voltage induced in the sense winding 13 and applied to the sense amplifier 17 will be of the form shown by the waveform 20 in FIGURE 2 which is comprised of a pair of voltage pulses of opposing polarity. The greater the length of the sense winding 13, the larger the amplitude and duration of the opposite polarity pulse has become. It is not uncommon to find the amplitude of the pulses to be of the order of 10–100 times the applied signal voltage. This induced voltage has become a dominant limiting factor in the construction of high-speed large capacity memories.

Figure 3:
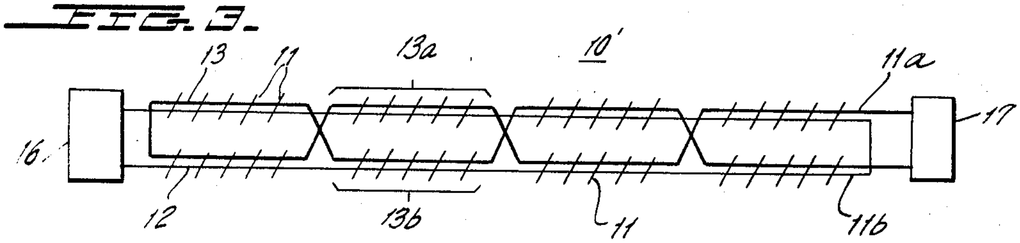
FIGURE 3 is a schematic of another conventional digit line coupling circuit which is a modification of the circuit of FIGURE 1.

FIGURE 3 shows another conventional memory arrangement 10' employing a conventional digit line coupling circuit which is capable of suppressing the induced voltage to a comparatively small value. In the arrangement of FIGURE 3 there is provided a plurality of memory elements 11 such as, for example, ferrite cores arranged in first and second rows **11*a* and 11*b*, respectively. The digit drive winding 12 is threaded through, or otherwise coupled to, all of the memory elements 11 with the winding 12 arranged in a substantially U-shaped fashion. The end terminals of winding 12 are coupled to the digit drive pulse source 16. The sense winding 13 is also threaded through or otherwise coupled to the magnetic cores 11 in such a way as to nullify the coupling coefficient by equally dividing the total length of the sense winding into the first and second rows of memory elements so that any two adjacent sections of the winding such as, for example, the sections 13*a* and 13*b* are of opposing polarity, thereby reducing the induced voltage signal in the sense winding 13 to a comparatively small value. While only first and second rows of the matrix 10'** are shown in FIGURE 3, it should be carefully understood that additional rows may be provided and it should further be understood that drive windings of the type shown in FIGURE 1 will also be provided in such a memory matrix.

As will be evident from the arrangement of FIGURE 3, the matrix assembly shown therein calls for the transposition of the sense winding 13, thereby making the matrix assembly appreciably complex. Another defect of the matrix assembly of FIGURE 3 is its inapplicability in cases where a single conductor is employed to serve the functions of both the digit drive winding and the sense winding.

In accordance with the instant invention, the induced noise signals referred to above, can be effectively cancelled out and at the same time the digit drop line can be employed to operate as the sense winding, which is quite advantageous in that the matrix structure is quite simplified.

Figure 4:
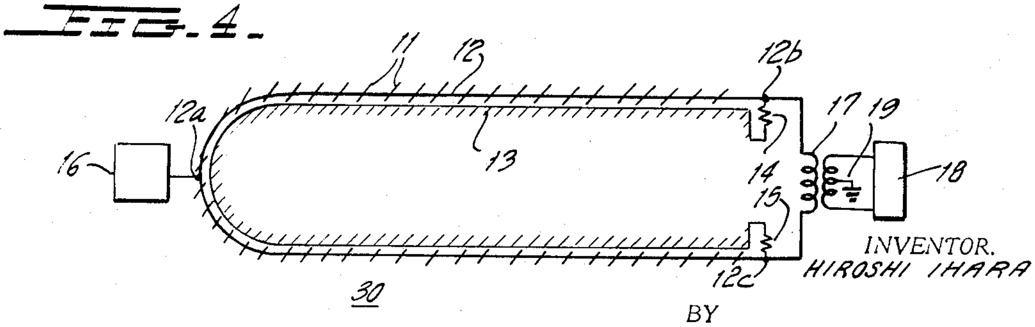
FIGURE 4 is a schematic of the digit line coupling circuit designed in accordance with the principles of the instant invention.

A schematic of the digit line coupling circuit of the instant invention is shown in FIGURE 4. The matrix assembly 30 of FIGURE 4 is comprised of a plurality of memory elements 11 such as, for example, magnetic cores. A drive pulse winding 12 is provided which is threaded through or otherwise coupled to all of the memory elements 11 and which is arranged in a substantially U-shaped fashion. A second winding 13 which is grounded over its entire length is disposed adjacent the drive pulse winding 12 so that it is a constant distance away from drive pulse winding 12 over its entire length. The digit drive winding 12 and the grounded conductor 13 act to form a distributed constant circuit or a simulated transmission line having a characteristic impedance $Z_O$.

A digit drive pulse source 16 is coupled to the digit drive line 12 at a point **12*a* which is equidistant from the end terminals 12*b* and 12*c* of the digit drive winding. The simulated transmission line is terminated at its end terminals with terminating resistances 14 and 15 having values equal to the characteristic impedance $Z_O$. The primary winding of a transformer 17 has its end terminals coupled to the end terminals 12*b* and 12*c* of the drive pulse line 12. The secondary of transformer 17 is coupled to a sense amplifier 18 and the midpoint of the secondary winding is grounded at 19**.

Figure 5:
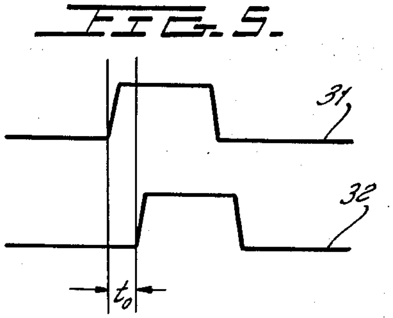
FIGURE 5 shows a plurality of waveforms for illustrating the operating principles of the circuit of FIGURE 4.

When a driving pulse signal is applied to the digit drive line 12 by the digit drive circuit 16 the pulse current is equally divided into halves at the midpoint **12*a* and moves along both halves of the circuit toward the termination resistances 14 and 15. Thus, if a digit drive pulse voltage such as that having the waveform 31 of FIGURE 5 is applied to line 12, a voltage having the waveform 32 which is equal both in amplitude and duration to the voltage waveform 31, but delayed in time by a duration $t_O$ will appear across each of the termination resistances 14 and 15. The signals appearing across the terminating resistances 14 and 15, however, will be exactly in synchronism and will be equal in amplitude so that no induced voltage can be applied to the sense amplifier circuit 18 through the transformer 17**.

In order that the coupling circuit of FIGURE 4 may be effective, the digit drive line 12 must be designed to be as uniform as possible to form a suitable simulated transmission line. Thus, the installation of a grounded conductor 13 becomes indispensable. This arrangement, however, is easily and inexpensively accomplished through the use of known technology in the printed circuit art. The transformer 17 serves the function of preventing a high-noise voltage induced by the digit drive current shown by the waveform 31 from being applied directly to the sense amplifier having a high gain. Consequently, the transformer 17 is indispensable as an integral part of the coupling circuit.

In conclusion, the digit line coupling circuit of the instant invention is characterized by comprising a grounded conductor which is arranged at substantially equal intervals and in close proximity to the digit drive line 12 to form a transmission line having a characteristic impedance $Z_O$. The terminating resistances having the same characteristic impedance $Z_O$ as the digit drive line is connected across the end terminals of conductors 12 and 13, a transformer coupled between the end terminals of the drive windings and a sense amplifier and a digit drive circuit which is connected substantially at the midpoint of the digit drive line 12.

With a digit drive line coupling circuit of the type described, not only is the induced voltage that would otherwise be applied to the sense amplifier at its input by a digit drive pulse completely nullified, but the matrix structure is greatly simplified thereby providing extremely advantageous in the construction of high-speed large capacity memories. It can also be readily seen from the foregoing that the digit line coupling circuit is extremely useful in driving memory elements in matrices where only a single line is disposed in each row of the memory matrix since the drive winding can serve both the function of the drive winding and the function of the sense winding.

It should also be evident from the foregoing that the digit line coupling circuit of the instant invention is applicable for use with all memory devices using ferrite cores, thin magnetic films, cylindrical films and the like.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A digit line coupling circuit for use in a memory device for storing binary information in an arrangement of a large number of magnetic memory elements disposed in a regular matrix, the improvement comprising:

a digit drive line coupled to each row of memory elements;

a plurality of grounded conductors each being associated with one of the digit drive lines and being arranged so as to be positioned in spaced parallel fashion to an associated digit drive line;

each digit drive line and its associated grounded conductor being a uniform transmission line having a characteristic impedance $Z_O$;

transformer means having input and output windings; said input winding having its end terminal coupled cross the end terminals of a digit drive line;

a sense amplifier coupled across the terminals of the output winding of said transformer means;

plural terminating resistance means coupled across each end terminal of said digit drive lines, said terminating resistances having the same characteristic impedance $Z_O$ as said uniform transmission line;

a digit drive circuit coupled to said drive winding at a point substantially equidistant from the end terminals of said digit drive line.

2. The device of claim 1 wherein said digit drive lines and their associated grounded conductors are disposed in a U-shaped arrangement.

3. The device of claim 1 wherein said memory elements are magnetic cores and said digit drive lines are threaded through an associated row of cores in said matrix.

References Cited

UNITED STATES PATENTS 3,293,622 12/1966 Pricer et al. ---------- 340—174

JAMES W. MOFFITT, Primary Examiner